(12) United States Patent
Duban-Hu et al.

(10) Patent No.: US 6,994,217 B2
(45) Date of Patent: Feb. 7, 2006

(54) SHIPPER WITH TOOTH DESIGN FOR IMPROVED LOADING

(75) Inventors: Joy A. Duban-Hu, Burnsville, MN (US); Steven P. Kolbow, Chaska, MN (US)

(73) Assignee: Entegris, Inc., Chaska, MN (US)

( * ) Notice: Subject to any disclaimer, the term of this patent is extended or adjusted under 35 U.S.C. 154(b) by 57 days.

(21) Appl. No.: 10/963,421

(22) Filed: Oct. 12, 2004

(65) Prior Publication Data

US 2005/0109665 A1    May 26, 2005

Related U.S. Application Data

(60) Provisional application No. 60/510,412, filed on Oct. 9, 2003.

(51) Int. Cl.
    *B65D 85/48*    (2006.01)
(52) U.S. Cl. .................... 206/711; 206/454; 206/832
(58) Field of Classification Search ............... 206/303, 206/307, 454, 710, 711, 832, 833; 211/41.18; 118/500
See application file for complete search history.

(56) References Cited

U.S. PATENT DOCUMENTS

| | | | | |
|---|---|---|---|---|
| 4,687,097 A | * | 8/1987 | Mortensen | 211/41.18 |
| 4,724,963 A | * | 2/1988 | Mortensen | 206/454 |
| 5,228,568 A | * | 7/1993 | Ogino et al. | 206/711 |
| 5,575,394 A | * | 11/1996 | Nyseth | 206/710 |
| 5,782,361 A | * | 7/1998 | Kakizaki et al. | 206/711 |
| 6,039,186 A | * | 3/2000 | Bhatt et al. | 206/711 |
| 6,427,850 B2 | * | 8/2002 | Mendiola | 211/41.18 |

* cited by examiner

*Primary Examiner*—Luan K. Bui
(74) *Attorney, Agent, or Firm*—Patterson, Thuente, Skaar & Christensen, P.A.

(57) ABSTRACT

A shipper for memory disks comprises a cassette having an open top and an open bottom, a top cover to cover the open top, and a bottom cover to cover the bottom. The body portion has opposing side walls and opposing end walls. The two side walls each have with a vertical upper portions and an inwardly converging bottom portion. Said sidewalls have inwardly facing elongate teeth or spacers defining slots to hold the substrates in a vertically positioned and spaced array. Each tooth is continuous from the open top to the open bottom and each tooth has a upper vertical portion at the vertical upper portion of the side wall and a converging lower portion at the bottom portion of the side walls. The converging lower portion of each tooth follows the convergence of the bottom portions of the sidewalls. The converging lower portion of each tooth is configured to be different than the configuration of the tooth at the upper portion providing for improved performance in receiving disks to minimize or eliminate the incomplete receipt of disks in the slots such as by the disks catching and resting on the top of the teeth.

7 Claims, 4 Drawing Sheets

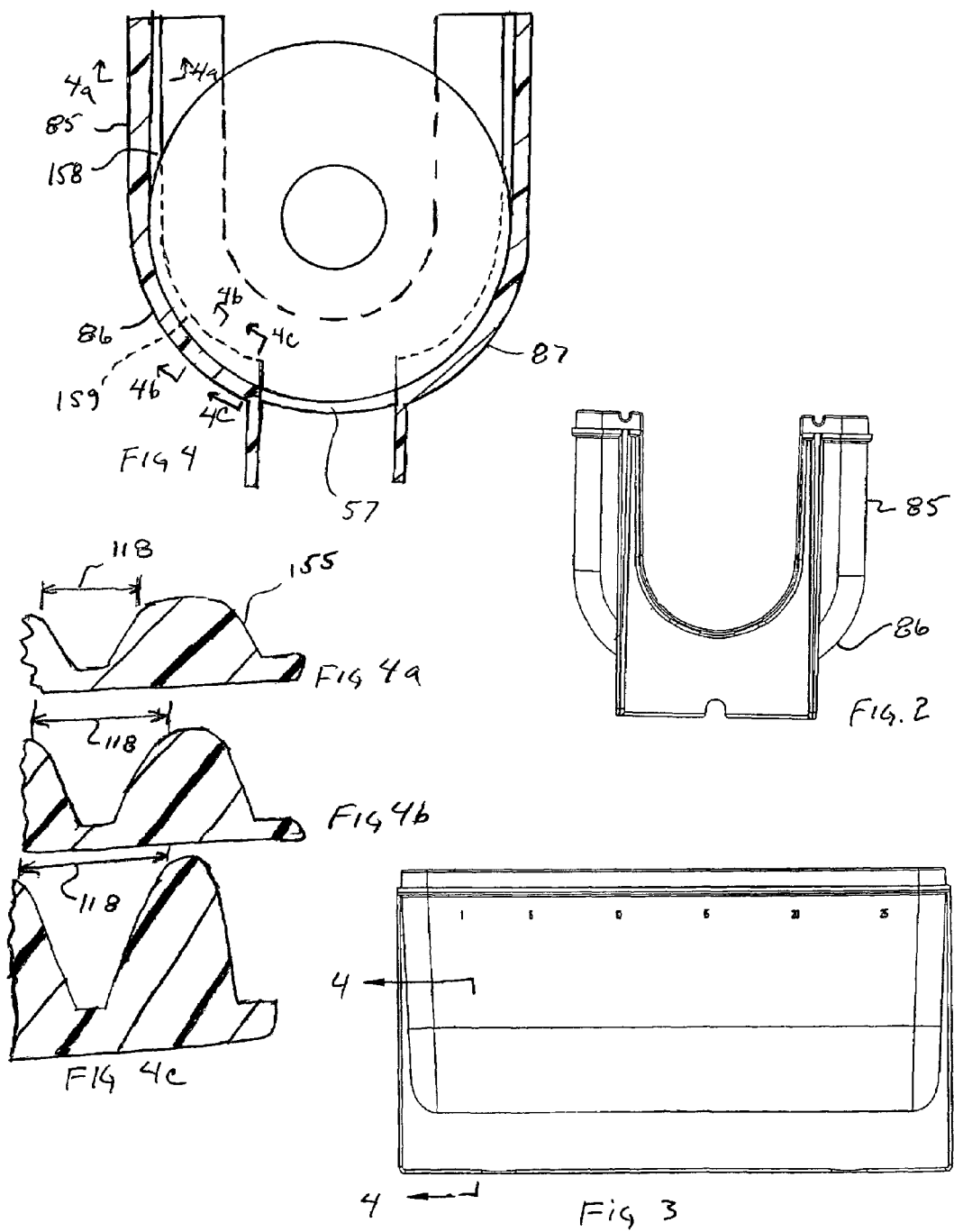

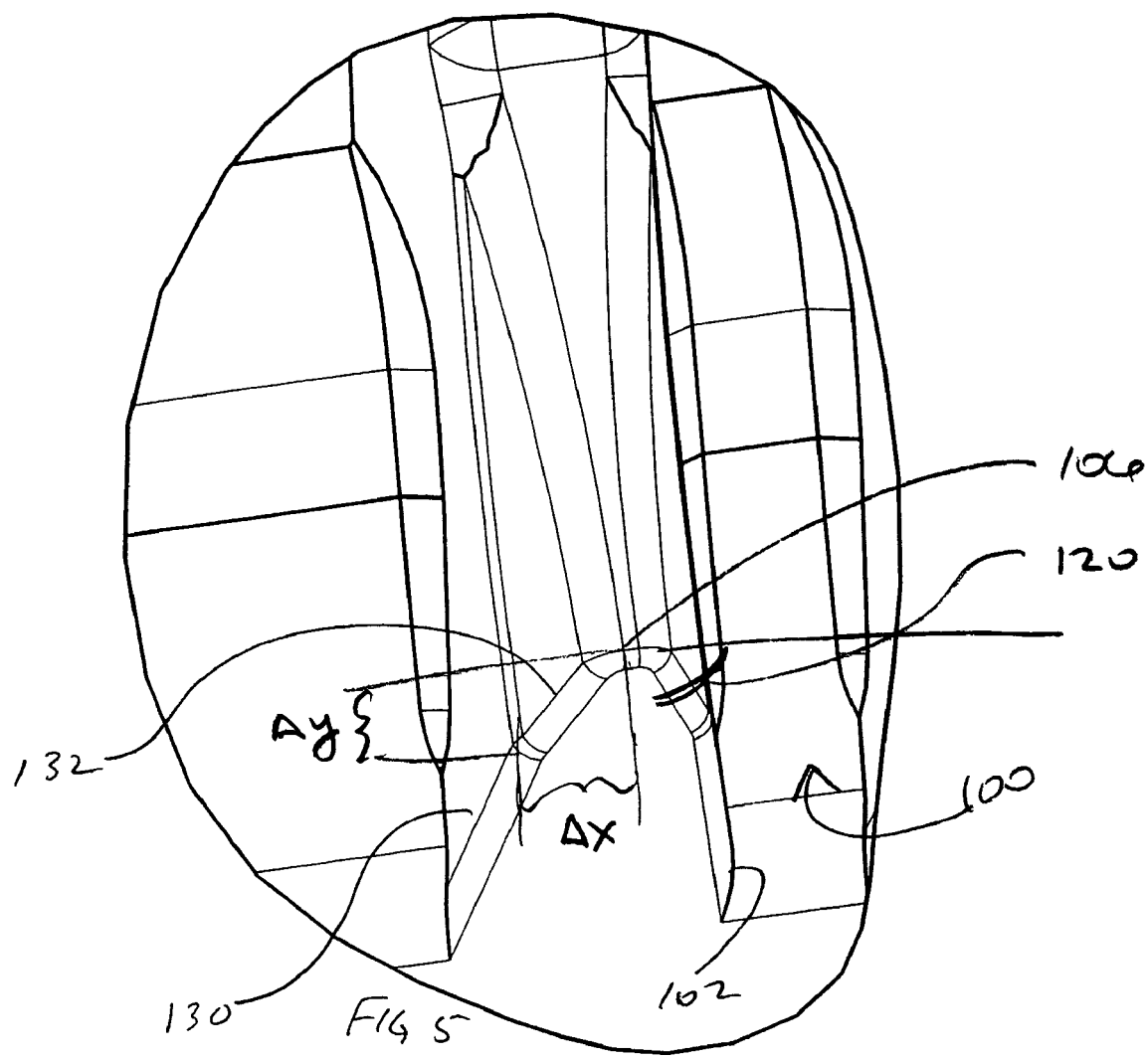

SHIPPER WITH TOOTH DESIGN FOR IMPROVED LOADING

This application claims the benefit of U.S. Provisional Application Ser. No. 60/510,412 filed Oct. 9, 2003, the same being incorporated herein by reference.

This invention relates to substrate carriers and containers where the substrates are retained in a spaced array.

BACKGROUND

The computer and semiconductor industry requires storage and transportation of memory disks for computer hard drives.

In the storage and transport of memory disks or other wafers hereinafter "substrates", there is always concern for the possibility of breakage and/or causing damage to the substrates or otherwise interrupting the processing and manufacturing steps. Many types of substrate carriers have spacers or "teeth" extending inwardly from the sidewalls to space the substrates from each other. The teeth generally have a uniform cross-section along their length. Shippers 10 for memory disks typically comprise a cassette 12 or body portion, a top cover 14 and a bottom cover 16 as illustrated in FIG. 7 having portions cut-away. The body portion has opposing side walls 20, 22 and opposing end walls 24, 26. The opposing sidewalls have inwardly facing teeth 30 or spacers to hold the substrates in a vertically positioned and spaced array. The cassette has an open top 32 and open bottom 34 to accommodate cleaning of the carrier and access to the substrates. Endwalls have U-shaped openings 40 to permit access to centrally located apertures in the hard disks. The top cover is configured to cover the open top as well as the U-shaped openings of the endwalls. Such carriers are illustrated in U.S. Pat. Nos. 4,557,382 and 5,253,755. These two patents are incorporated herein by reference.

One difficulty encountered in the use of conventional substrate carriers is that the substrates do not always load perfectly into the slots in the carriers. This is particularly true for hard disk shippers such as illustrated in the '382 and '755 patents. The slots, which are defined by ribs or teeth on the sidewalls, are designed to vertically receive the disks and provide a separation that keeps the disks from contacting each other. The disks, however, sometimes come to rest on top of the teeth that separates the slots and do not fully seat in the slot and can contact adjacent disks. As a result, the disks can be damaged or interfere with processing. A configuration is needed to avoid this problem and minimize cost and expense of modifications of existing tooling to manufacture such a configuration.

SUMMARY OF THE INVENTION

In preferred embodiments, a shipper for memory disks comprises a cassette or body portion having an open top and an open bottom, a top cover to cover the open top, and a bottom cover to cover the bottom. The body portion has opposing side walls and opposing end walls. The two side walls each have with a vertical upper portions and an inwardly converging bottom portion. Said sidewalls have inwardly facing elongate teeth or spacers defining slots to hold the substrates in a vertically positioned and spaced array. Each tooth is continuous from the open top to the open bottom and each tooth has a upper vertical portion at the vertical upper portion of the side wall and a converging lower portion at the bottom portion of the side walls. The converging lower portion of each tooth follows the convergence of the bottom portions of the sidewalls. The converging lower portion of each tooth is configured to be different than the configuration of the tooth at the upper portion providing for improved performance in receiving disks to minimize or eliminate the incomplete receipt of disks in the slots such as by the disks catching and resting on the top of the teeth rather than being fully received in the slots. Preferred embodiments have increased guide-in surfaces on each of the teeth adjacent the open bottom to better guide the disks into the respective slots. This effectively widens each slot so as to provide a larger receiving region. Particular embodiments provide, at the lower converging portion, higher teeth elevation with respect to the sidewall for improved wafer alignment. Particular embodiments provide for, at the same location, a greater or sharper taper of each tooth at the lower converging portion. Particular embodiments provide a reduced diameter apex of each tooth at the lower converging portion compared to the upper portion for minimizing the potential of disks coming to rest on top of the teeth. Particular embodiments provide a continual and smooth transition of the relatively wide apex on each tooth at the juncture of the upper portion and lower portion to the sharpest peak directly adjacent the open bottom. Particular embodiments provide a transition from a flattened apex on each tooth at the juncture of the upper portion and lower portion to a rounded narrow peak directly adjacent the open bottom. Particular embodiments provide a tooth height profile that is concentric with the circumference of the disks beginning at the juncture between the upper portion of each tooth and then has a decreasing radius as the tooth approaches the open bottom. Other embodiments provide for combinations of these features.

A feature and advantage of the invention is that there is a higher margin of error in the positioning of a disk or substrate being inserted into a slot.

A feature and advantage of the invention is that incomplete receipt and misplacement of disks being inserted into the cassette is minimized or eliminated.

A feature and advantage of the invention is that the improvement may be accomplished on existing plastic product by primarily or exclusively removing addition steel from the molds at the teeth forming area.

A feature and advantage of the invention is that other performance characteristics are not affected or minimally affected by adding the configurations of the invention to a cassette.

A feature and advantage of the invention is that utilization of the wider slot and greater guide-in areas only on the region adjacent to the open bottom and not on the vertical portions of the teeth accomplishes the improved functioning while minimizing cost and weight. Less plastic is used in that the vertical portions of the teeth do not have the full tooth profile of the tooth at the open bottom.

FIGURES

FIG. 2 depicts an end view of the cassette of FIG. 1;

FIG. 3 depicts a side elevational view of the cassette;

FIG. 4 depicts a cross-sectional view of a cassette with a disk in place;

FIG. 4a is a cross sectional view taken at 4a—4a of FIG. 4;

FIG. 4b is a cross sectional view taken at 4b—4b of FIG. 4;

FIG. 4c is a cross sectional view taken at 4c—4c of FIG. 4;

FIG. 5 is an enlarged partial perspective view of the region A denoted in FIG. 1;

DETAILED DESCRIPTION OF PREFERRED EMBODIMENTS

Figure 7:
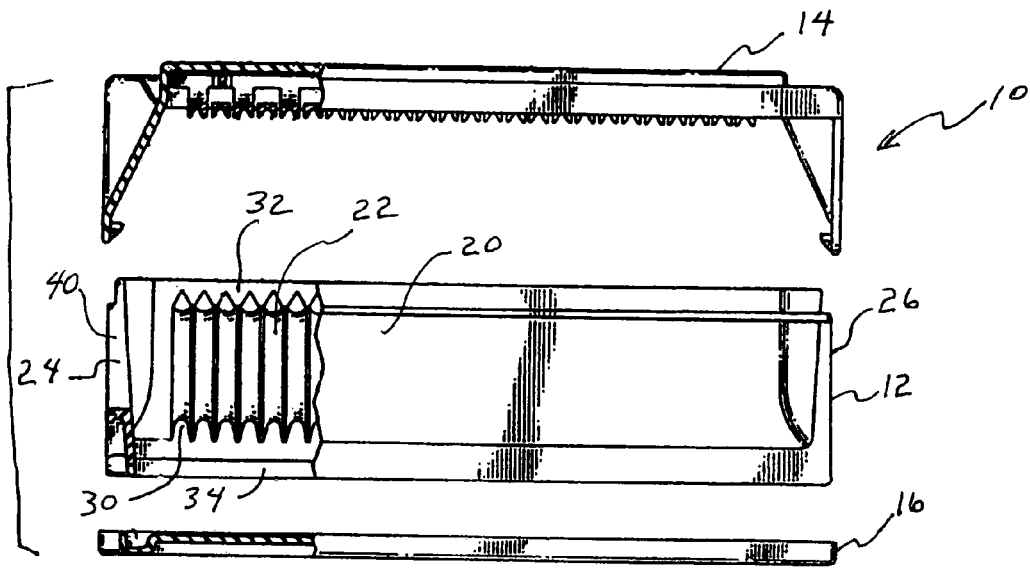
FIG. 7 is an elevational view of a prior art disk shipper with a cassette, a top cover, and a bottom cover.
Figure 1:
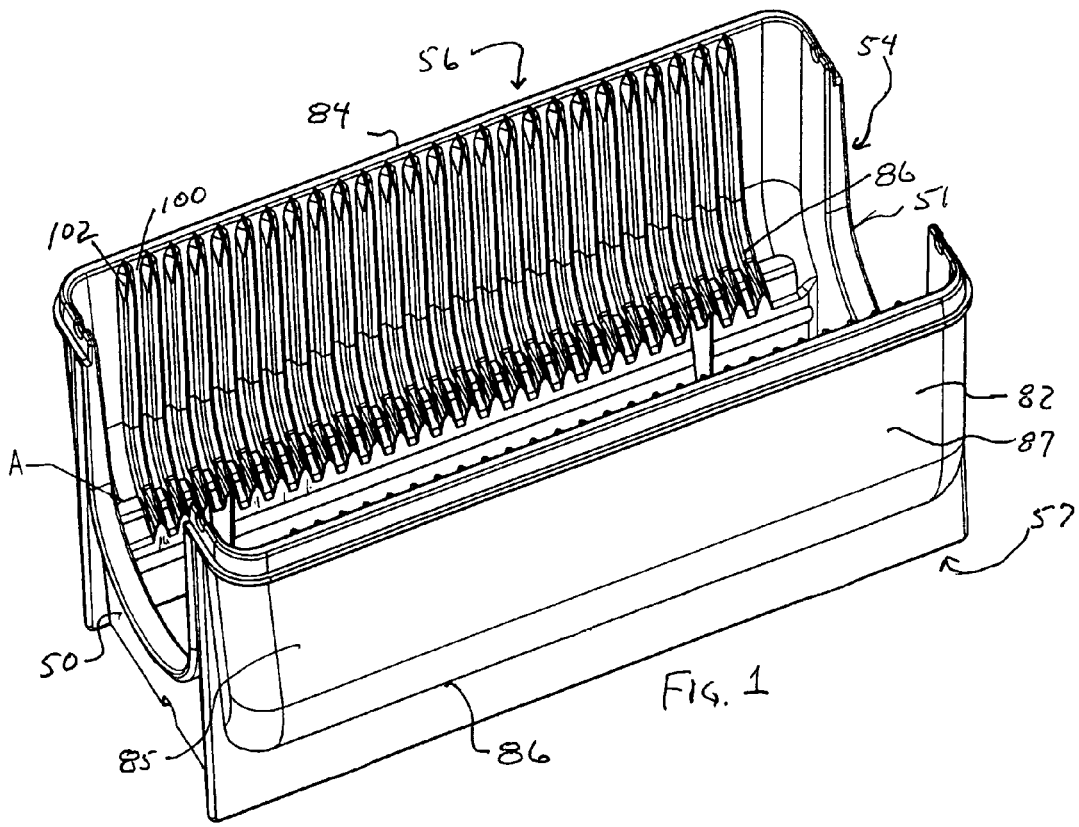
FIG. 1 depicts a perspective view of cassette.
Figure 6:
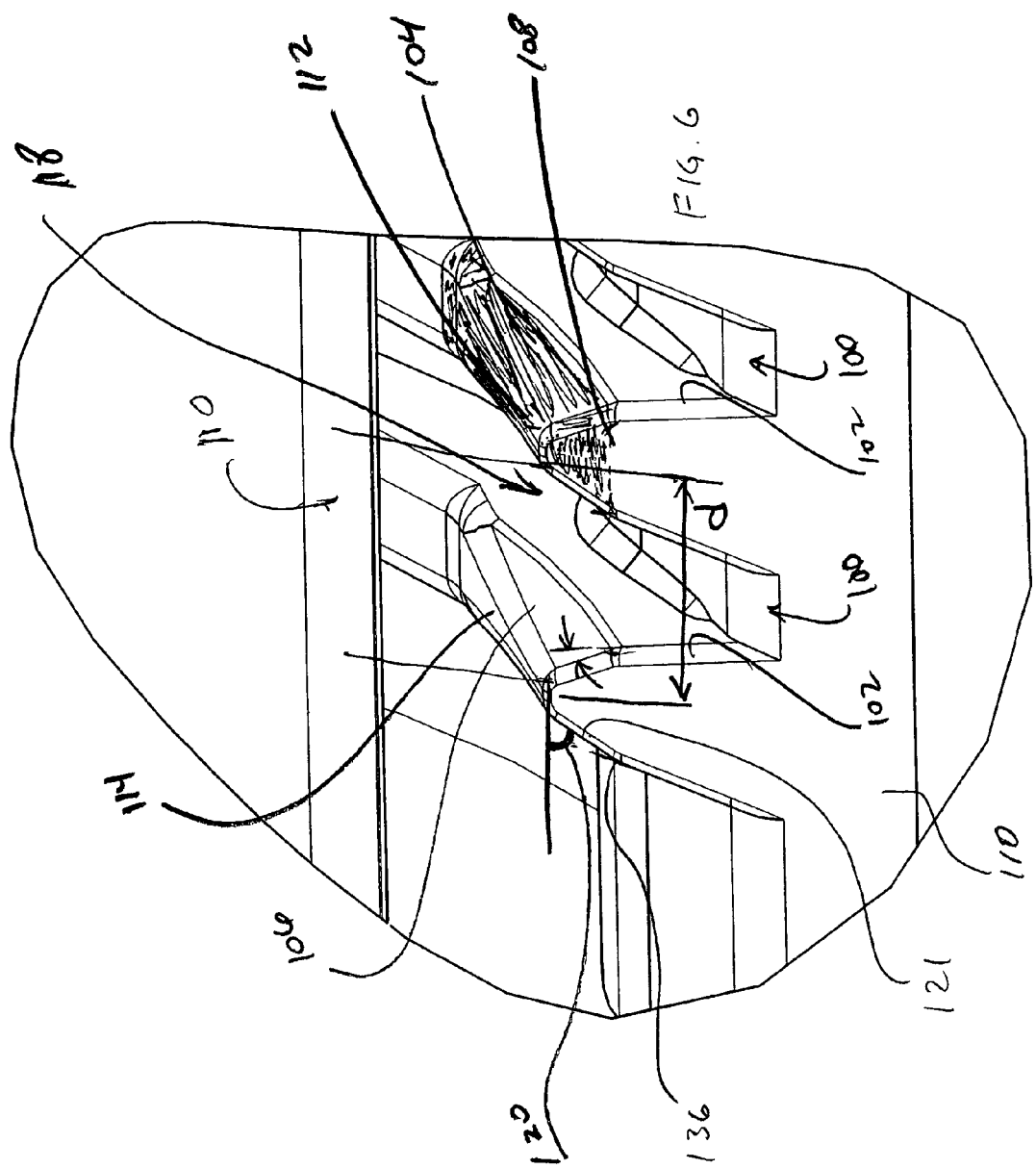
FIG. 6 is an enlarged partial perspective view of a tooth at the bottom opening of the cassette.

FIGS. 1–5 depict various views of a substrate carrier configured as a cassette of memory disk shipper. The cassette is typically part of a disk shipper with a top cover and bottom cover as illustrated in prior art FIG. 7. The cassette has two endwalls with 50, 51 with U shaped openings 54, an open top 56, an open bottom 57, two sidewalls 82, 84 with vertical upper portions 85, and converging lower portions 86, an outside surface 87 and, as illustrated in FIGS. 5 and 6 in detail, slots 100 that are defined by ribs or teeth 102. The teeth have apexes 104, 106 typically configured as rounded portions. Rounded portion 104 is shaded in FIG. 6 for clarity to emphasize that the rounded portions 104, 106 are distinct from conventional approaches that generally have a flat or flatter top 108 on each tooth extending the full length of the tooth. This illustrates the potential conversion of a mold with conventional teeth pattern to that of the invention herein. The additional metal in the mold reflected by the shaded portion is removed to create the improved tooth profile at the converging lower portion.

Referring to FIGS. 4, 4a, 4b, 4c, apex 104 becomes sharper as the tooth approaches the open bottom so that the distance between the lead-in surfaces is maximized, thereby increasing receiving area 118. Receiving area 118 receives the edge of the substrate so that the substrate can be loaded into the carrier. Each tooth is continuous from the open top to the open bottom and each tooth has a upper vertical portion 158 at the vertical upper portion of the side wall and a converging lower portion 159 at the bottom portion 86 of the side walls. The converging lower portion of each tooth follows the convergence of the bottom portions of the sidewalls.

Referring to FIGS. 5 and 6, angle 120, referred to as the angle of deflection, is defined by the intersection of a line tangent to the top or apex of the teeth and a line tangent to a side of the upper portions 132 of the teeth and is about preferably about sixty degrees.

As depicted in the Figures, the tops are rounded, curved, or have convex portions so that wafers engaging the teeth on the sidewalls are deflected and not allowed to come to rest on top of the apex. The angle of deflection of the sides 155 of the tooth is selected so that substrates encountering the sidewalls are directed into the slots. Examples of angles of deflection are, e.g., from more than 45 to less than 90, and all values or ranges therebetween.

In some embodiments, another aspect of the sidewalls, e.g., as depicted in the FIGS. 1–6 is the distance, d, between the tops of the teeth where the outside surface of the tooth commences to extend in a downward direction toward the base of the tooth, for example, more than 45 degrees. This distance is advantageously increased toward the open bottom so that the substrates are less likely to encounter a sidewall during insertion. The increase in distance may be accomplished by building tapers into the sidewalls so that they taper from a narrow point at the top of the sidewalls, where a substrate is received, to a broader base near the body of the carrier.

In some embodiments, another aspect of the sidewalls, e.g., as depicted in the FIGS. 4, 4l, 4b, and 4c is the tooth height relative to conventional sidewalls. The increased height of the teeth near the bottom of the substrate carrier allows for the addition of a greater taper and improves guidance of the substrate into a slot.

Disk shippers as conventionally injection molded of thermoplastics such as polycarbonate. For further details generally common to such disk shippers see U.S. Pat. Nos. 4,557,382 and 5,253,755. These two patents are incorporated herein by reference.

Although the preferred embodiment of the disk shipper has been described herein, numerous changes and variations can be made and the scope of the invention is dependent upon the claims rather than specific embodiments disclosed.

What is claimed is:

1. A disk shipper for shipping memory disks, the shipper comprising a cassette having opposing side walls and opposing end walls, an open top, and an open bottom,
   a top cover to cover the open top,
   a bottom cover to cover the bottom
   the two side walls of the cassette each having a vertical upper portion and an inwardly converging bottom portion, said sidewalls have a plurality of inwardly facing elongate teeth defining slots to hold the substrates vertically positioned and in a spaced array, each tooth being continuous from adjacent to the open top to adjacent the open bottom, each tooth having an upper portion at the vertical upper portion of the side wall and a converging lower portion at the converging bottom portion of the side walls, in cross-section each tooth having an apex and wherein the sharpness of the apex increases towards the open bottom and being at a maximum sharpness directly adjacent the open bottom.

2. The disk shipper of claim 1 wherein in cross-section each tooth has a length and wherein the length of the tooth increases to maximum at the open bottom.

3. The disk shipper of claim 1 wherein the plurality of teeth of each sidewall comprise a plurality of adjacent pairs defining disk receiving slots and wherein each slot has a width and wherein the width of each slot increases as the teeth approach the open bottom.

4. A disk shipper for shipping memory disks, the shipper comprising a cassette having opposing side walls and opposing end walls, an open top, and an open bottom,
   a top cover to cover the open top,
   a bottom cover to cover the bottom
   the two side walls of the cassette each having a vertical upper portion and an inwardly converging bottom portion, said sidewalls have a plurality of inwardly facing elongate teeth defining slots to hold the substrates vertically positioned and in a spaced array, each tooth being continuous from adjacent to the open top to adjacent the open bottom, each tooth having an upper portion at the vertical upper portion of the side wall and a converging lower portion at the converging bottom portion of the side walls, the teeth defining a plurality of slots and wherein the teeth are configured to expand the slot as the teeth approach the open bottom thereby providing an enlarged receiving area for the disks during insertion.

5. A disk shipper for shipping memory disks, the shipper comprising a cassette having opposing side walls and opposing end walls, an open top, and an open bottom,
   a top cover to cover the open top,
   a bottom cover to cover the bottom the two side walls of the cassette each having a vertical upper portion and an inwardly converging bottom portion, said sidewalls have a plurality of inwardly facing elongate teeth defining slots to hold the substrates vertically positioned and in a spaced array, each tooth being continuous from adjacent to the open top to adjacent the open bottom, each tooth having an upper portion at the vertical upper portion of the side wall and a converging lower portion at the converging bottom portion of the side walls, each tooth having a tooth radial height profile that is concentric with the circumference of the disks beginning at the juncture between the upper portion of each tooth and the lower converging portion of each tooth and then has an increasing height profile corresponding to a decreasing radius as the tooth approaches the open bottom.

6. A disk shipper for shipping memory disks, the shipper comprising a cassette having opposing side walls and opposing end walls, an open top, and an open bottom, a top cover to cover the open top, a bottom cover to cover the bottom the two side walls of the cassette each having a vertical upper portion and an inwardly converging bottom portion, said sidewalls have a plurality of inwardly facing elongate teeth defining slots to hold the substrates vertically positioned and in a spaced array, each tooth being continuous from adjacent to the open top to adjacent the open bottom, each tooth having an upper portion at the vertical upper portion of the side wall and a converging lower portion at the converging bottom portion of the side walls, in cross-section each tooth having an apex and wherein the radius defining the apex decreases towards the open bottom and being at a minimum radius adjacent the open bottom.

7. The disk shipper of claim 6 wherein the plurality of teeth of each sidewall comprise a plurality of adjacent pairs defining disk receiving slots and wherein each slot has a width and wherein the width of each slot increases as the teeth approach the open bottom.

* * * * *

UNITED STATES PATENT AND TRADEMARK OFFICE
CERTIFICATE OF CORRECTION

PATENT NO. : 6,994,217 B2  
APPLICATION NO. : 10/963421  
DATED : February 7, 2006  
INVENTOR(S) : Joy A. Duban-Hu and Steven P. Kolbow It is certified that error appears in the above-identified patent and that said Letters Patent is hereby corrected as shown below:

Title page; Item (57) ABSTRACT, Line 5, please remove "with" from the sentence  
ABSTRACT, Line 10, replace "a" with --an--  
Column 1, Line 59, please remove "with" from the sentence  
Column 1, Line 59, please replace "portions" with --portion--  
Column 1, Line 64, please replace "a" with --an--  
Column 2, Line 41, please replace "addition" with --additional--  
Column 3, Line 37, please replace "a" with --an--  
Column 3, Line 46, please remove "about" from the sentence  
Column 4, Line 2, please replace "41" with --4a--  
Column 4, Line 7, please replace "as" with --are--

Signed and Sealed this

Eighth Day of July, 2008

JON W. DUDAS  
*Director of the United States Patent and Trademark Office*